(12) United States Patent
Ben-Natan

(10) Patent No.: US 10,402,451 B2
(45) Date of Patent: Sep. 3, 2019

(54) HYBRID STORAGE AND PROCESSING OF VERY LARGE DATABASES

(71) Applicant: jSonar Inc., Lexington, MA (US)

(72) Inventor: Ron Ben-Natan, Lexington, MA (US)

(73) Assignee: JSonar Inc., Lexington, MA (US)

( * ) Notice: Subject to any disclaimer, the term of this patent is extended or adjusted under 35 U.S.C. 154(b) by 502 days.

(21) Appl. No.: 15/006,249

(22) Filed: Jan. 26, 2016

(65) Prior Publication Data

US 2017/0212955 A1 Jul. 27, 2017

(51) Int. Cl.
*G06F 16/80* (2019.01)

(52) U.S. Cl.
CPC .................. *G06F 16/80* (2019.01)

(58) Field of Classification Search
CPC .............. G06F 17/30675; G06F 17/30908
See application file for complete search history.

(56) References Cited

U.S. PATENT DOCUMENTS

| | | | | |
|---|---|---|---|---|
| 9,507,762 | B1* | 11/2016 | Lashley | G06F 16/00 |
| 2009/0271445 | A1* | 10/2009 | Emaru | G06F 11/2069 |
| 2014/0214838 | A1* | 7/2014 | Hendrey | G06F 17/30622 707/737 |
| 2015/0296009 | A1* | 10/2015 | Yang | H04W 8/22 709/204 |

* cited by examiner

*Primary Examiner* — Loc Tran
(74) *Attorney, Agent, or Firm* — Armis IP Law, LLC

(57) ABSTRACT

A system and method of storing data in an unstructured or semi-structured database, such as a JSON database, includes defining a columnar store, or hybrid column portion having a set of values for each field, such that each set stores a sequence of values from commonly named fields of each document together, and defining a hybrid store, or hybrid row portion having, for each document in the columnar store, a hybrid entry storing fields from the same document together, such that each entry in the hybrid store includes fields of a corresponding document represented in the columnar store. The hybrid arrangement provides that both the columnar store and the hybrid store are derived from the same set of documents, and each of the columnar store and the hybrid store are configured to fulfill a query request for determining whether to access the columnar store or the hybrid store.

17 Claims, 4 Drawing Sheets

HYBRID STORAGE AND PROCESSING OF VERY LARGE DATABASES

RELATED APPLICATIONS

This patent application is related to U.S. patent application Ser. No. 14/304,497, filed Jun. 13, 2014, entitled "COLUMNAR STORAGE AND PROCESSING OF UNSTRUCTURED DATA," incorporated herein by reference in entirety.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Unstructured databases have no formal field or record structure, and may be more accurately characterized as a collection of facts. Unlike their structured counterparts, such as a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field. The document-based arrangement of unstructured databases stores the documents in a sequential order, typically in a sequence of readable characters with delimiters to denote fields (i.e. Unicode, ASCII, or similar). Each document stores a set of fields of the document together. Accordingly, reading a common field from a range of documents typically involves parsing each of the documents and retrieving the desired field. In a large collection having many documents, the volume of parsed documents can be substantial.

SUMMARY

An unstructured or semi-structured database employs a hybrid storage arrangement for accessing values of data fields accordingly to either a column-centric or document-centric approach. A column-centric approach stores values of similarly named fields together, and a document-centric approach stores values of a document together. In contrast to conventional approaches, which are based on tabular formats of rigidly defined rows and columns, the hybrid approach allows fast, efficient retrieval of values from either the same field or the same document. Conventional approaches structure data according to a single grouping pattern, such as favoring documents or fields, similar to row-major or column major ordering in structured databases. Access patterns for queries, reports and updates that do not align with the grouping pattern may require parsing or scanning long spans of extraneous data to find desired fields, and/or require repeated fetching to the same page or area for adjacent values that are accessed intermittently.

The disclosed hybrid approach receives data for a plurality of fields in documents, in which each field has a value, such as in a JSON (JavaScript Object Notation) database, storing the values of similar fields together, and also storing an aggregation of fields from each document together. In a particular configuration, the hybrid database takes the form of a dual storage arrangement by defining a hybrid column portion having a sequential file for each commonly named field from across all documents in the collection, such that the hybrid column portion stores similarly named fields adjacently. The hybrid database also includes a hybrid row portion having a sequential file for storing each document in the collection, in which the hybrid row portion stores fields in each document adjacently. Although there is duplication of raw data values for the hybrid arrangement, increased access efficiency coupled with robust compression to limit storage requirements affords greater performance using the hybrid arrangement.

Configurations herein are based, in part, on the observation that the arrangement of fields containing data values can substantially affect performance depending on which fields are accessed. Unfortunately, conventional approaches to processing unstructured data suffer from the shortcoming that data storage arrangement decisions are made prior to and without any indication of how the data will be accessed. Data access patterns that do not align with the data storage can result in substantial parsing and/or retrieval of unreferenced fields. In a large database, the impact on processing time and resources can be substantial. For example, in a database operation employing a matching or grouping operation on a particular field value, a field based or column-centric approach is likely to prevail because only the match values are needed. In contrast, a reporting operation for extracting most or all fields of selected documents would likely benefit from having each document intact, as otherwise values need be gathered from each field individually, and the process repeated for each document. Other operations, such as a projection, may encounter a tradeoff based on the number of fields sought in the document, and trigger an inquiry into query logic for computing an optimal access (either columnar or document based).

Accordingly, configurations herein substantially overcome the above described shortcomings of storage arrangements being unaligned or differing from the access patterns by defining a hybrid approach that stores fields from the documents according to both a columnar form, in which like fields are stored together, and a hybrid or document centric counterpart in which fields in the same document are stored together. Query, retrieval and update operations incorporate one or the other based on a computation of the most efficient approach. The resulting collection defines a hybrid database having data stored as both a column store and a row store. The hybrid database stores individually named fields as a column store, and also stores each document in a row store or document store as if it were a separate field, thereby storing each document in a hybrid row and column arrangement.

Described below is a method and apparatus for implementing a so-called "Big Data" system for storing, retrieving, querying and managing unstructured data formatted as JSON (JavaScript Object Notation) documents. The system stores the data in a hybrid arrangement incorporating features of both column-centric and document-centric arrangement allowing for improved access times. In further detail, configurations herein depict a method of storing data in a database arranged as a set of documents, such as a JSON database, including defining a hybrid column portion having a set of values for each field, in which each set stores a sequence of values from commonly named fields of each document together, and defining a hybrid row portion having, for each document in the hybrid column portion, a hybrid entry in the hybrid row portion, such that each entry in the hybrid row portion includes fields of a corresponding document represented in the hybrid column portion stored together with the other fields in the document. The hybrid arrangement provides that both the hybrid column portion and the hybrid row portion are derived from the same set of documents, and each of the hybrid column portion and the hybrid row portion are configured to fulfill a query request of the database based on query logic for determining whether to access the hybrid column portion or the hybrid row portion.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein disclose an example database storage management system for storing unstructured and semi-structured data as a hybrid database as described herein. Depicted below are examples of hybrid data storage and the corresponding operations and storage arrangements for the hybrid form.

Figure 1:
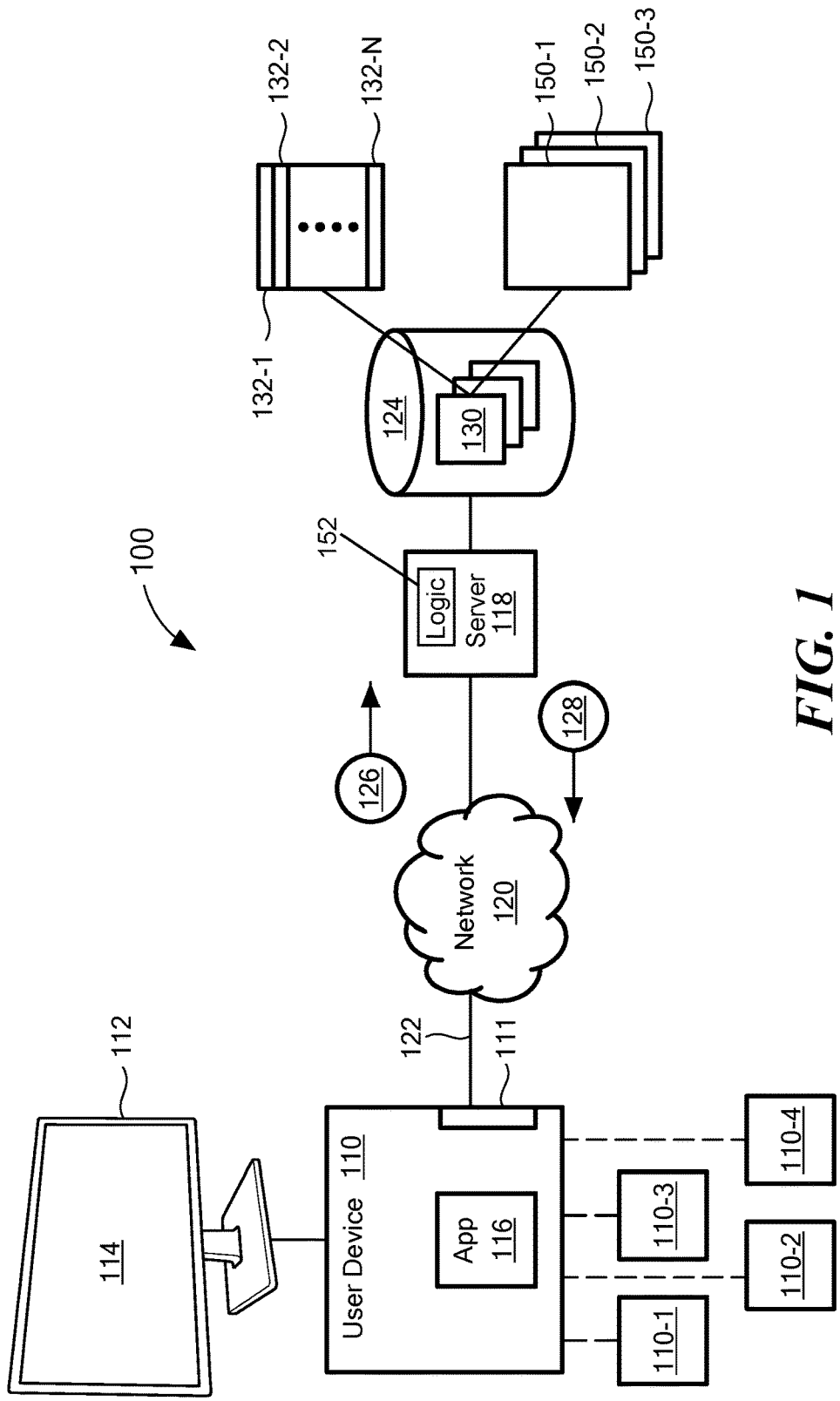
FIG. 1 is a context diagram of a computing environment suitable for use with configurations disclosed herein.

FIG. 1 is a context diagram of a computing environment 100 suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, an I/O (Input/Output) interface 111, and an application processor for launching and executing an application 116 for data storage, user queries and/or responses. The visual display 112 present a graphical user interface (GUI) 114 for user interaction, and receives input from a user and renders responses to user queries, as discussed further below. Any appropriate device may be employed, such as mobile devices 110-1 (smartphones, tablets), laptops 110-2, desktops 110-3, or other computing device 110-4 suitable for user interaction, rendering and Internet connectivity. The application 116 interacts with a database server 118, which may be accessible via a public access network 120 such as the Internet. The server 118 employs one or more network links 122, for accessing a database 124 such as a non-volatile storage medium having unstructured data stored in collections 130 and database files 150. Each collection includes a number of documents 132-1 . . . 132-n (132 generally). Configurations disclosed herein present a method of storing and accessing the database files 150-1 . . . 150-3 (150 generally) for storing the collections 130 of unstructured data. Using operations and methods disclosed further below, collections 130 are stored in the database files 150 for facilitating and expediting access and usage by a user application 116. Each collection 130 may generate a plurality of database files 150 (files) including both value-centric and document centric (hybrid) files. In usage, the application 116 may issue a query request 126 from the user, and invoke the database server 118 for generating a response 128 for rendering on the display 112. Query logic 152 is used to compute, based on a number of documents sought from the query request and a number of fields from each document, whether to access the hybrid column portion or the hybrid row portion.

The examples shown depict JSON files on storage volumes such as hard disks (HDD) or solid state drive (SSD) storage mediums, although other formats and media could be employed. JSON format is a scripted grammar often implemented in a Unicode text file for describing data items as objects. JSON information is typically composed of many JSON documents. Each document can be composed of any number of fields, each of a specific type, and also of any number of subdocuments, each of which is also a JSON document, thus defining a recursive structure. It is possible to store in a field an array of items of the same type or of different types, including arrays and subdocuments. The various documents do not necessarily have the same structure. This kind of approach to information storage is called "unstructured" and is very flexible. This flexibility and ease of use have caused JSON to become the de-facto standard of representing and managing unstructured data in applications.

Figure 2:
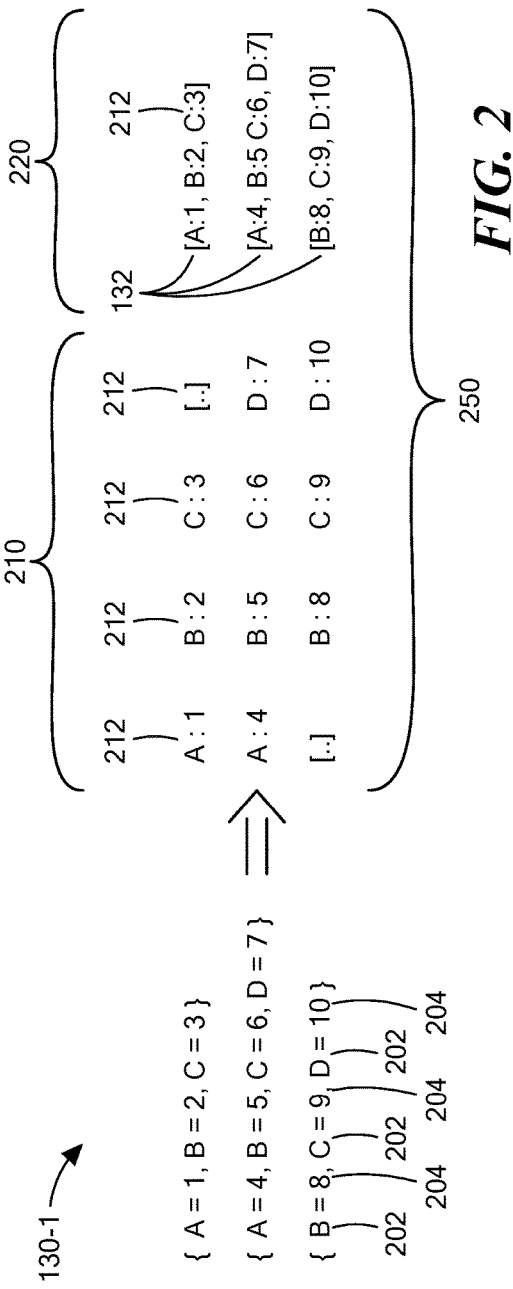
FIG. 2 is an example of document storage in the database of FIG. 1.

FIG. 2 is an example of document storage in the database of FIG. 1. Referring to FIGS. 1 and 2, a collection of data 130-1 having fields 202, each with a name (e.g. A, B, C, etc.) and a value 204 may be represented by a JSON collection, for example. The server 118 stores the collection 130 as a column centric, or hybrid column portion 210 and a document centric, or hybrid row portion 220. The named values 204 are stored in groups 212, shown as columns, such that the hybrid column portion 210 groups similarly named fields together, and the hybrid row portion 220 groups fields in the same document 132 together. The disclosed groups are defined as a hybrid column portion, such as that shown in copending U.S. patent application Ser. No. 14/304,497, filed Jun. 13, 2014, entitled "COLUMNAR STORAGE AND PROCESSING OF UNSTRUCTURED DATA," incorporated herein by reference. Alternatively, the groups may be stored in an alternate arrangement for locating the name-associated or document-associated values together. In the columnar storage approach, writing values in the hybrid row portion 220 includes receiving a value of a first data field, and receiving a value of a second data field. The database 124 stores the value of the first data field in a first hybrid column portion, and stores the value of the second data field in a second hybrid column portion to define the hybrid column portion. For the hybrid row portion 220, however, the database 124 stores the first data field and the second data field together as a field in the hybrid row portion 220. The collective hybrid column portion 210 and hybrid row portion 220, therefore, define the hybrid database 250 accessible selectively and alternately by value centric or document centric approaches.

Figure 3:
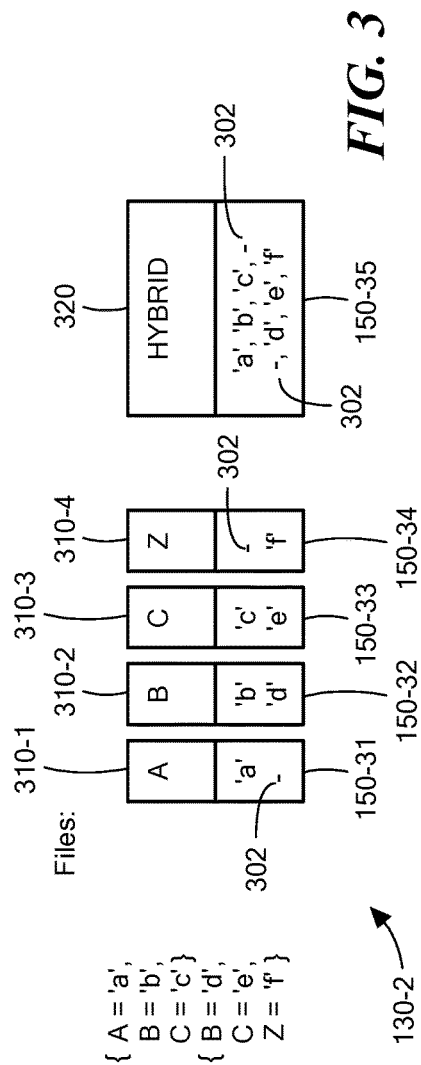
FIG. 3 is an example of a file used for storing a collection according to FIG. 2.

FIG. 3 is an example of a file used for storing a collection according to FIG. 2. Referring to FIGS. 1-3, in the particular configuration shown, the groups of associated values are stored in files 150 in the database 124 or similar storage medium. FIG. 3 shows another collection 130-2 stored in files 150-31-150-35. The associated values for similarly named fields are stored in respective columnar files 310-1 . . . 310-4, which store all similarly named fields from multiple documents together in adjacent or consecutive locations. Placeholder or null values 302 are used to preserve ordering and value to document associations when documents have different fields. Therefore, when a query or access request involves matching on a particular field value, only the file 310 containing the field need be accessed.

Groups of values belonging to the same document 132 are stored in the hybrid file 320, which stores values from the same document in adjacent or consecutive locations. While duplicative, this ensures that related values in the same file may be retrieved simultaneously. Otherwise, separate inquiries or fetches would need to be performed in each of the field name associated files 310 to retrieve a single document 132. For example, a typical report might render or display all document fields following a match on a particular key field. Retrieval of all values in an individual document is performed by retrieving all adjacent values of the document from the hybrid file 320, thus requiring a single fetch (or possible 2, if the document spanned multiple blocks or storage units), rather than performing a retrieval from each field 202 based grouping in files 310.

Figure 4A:
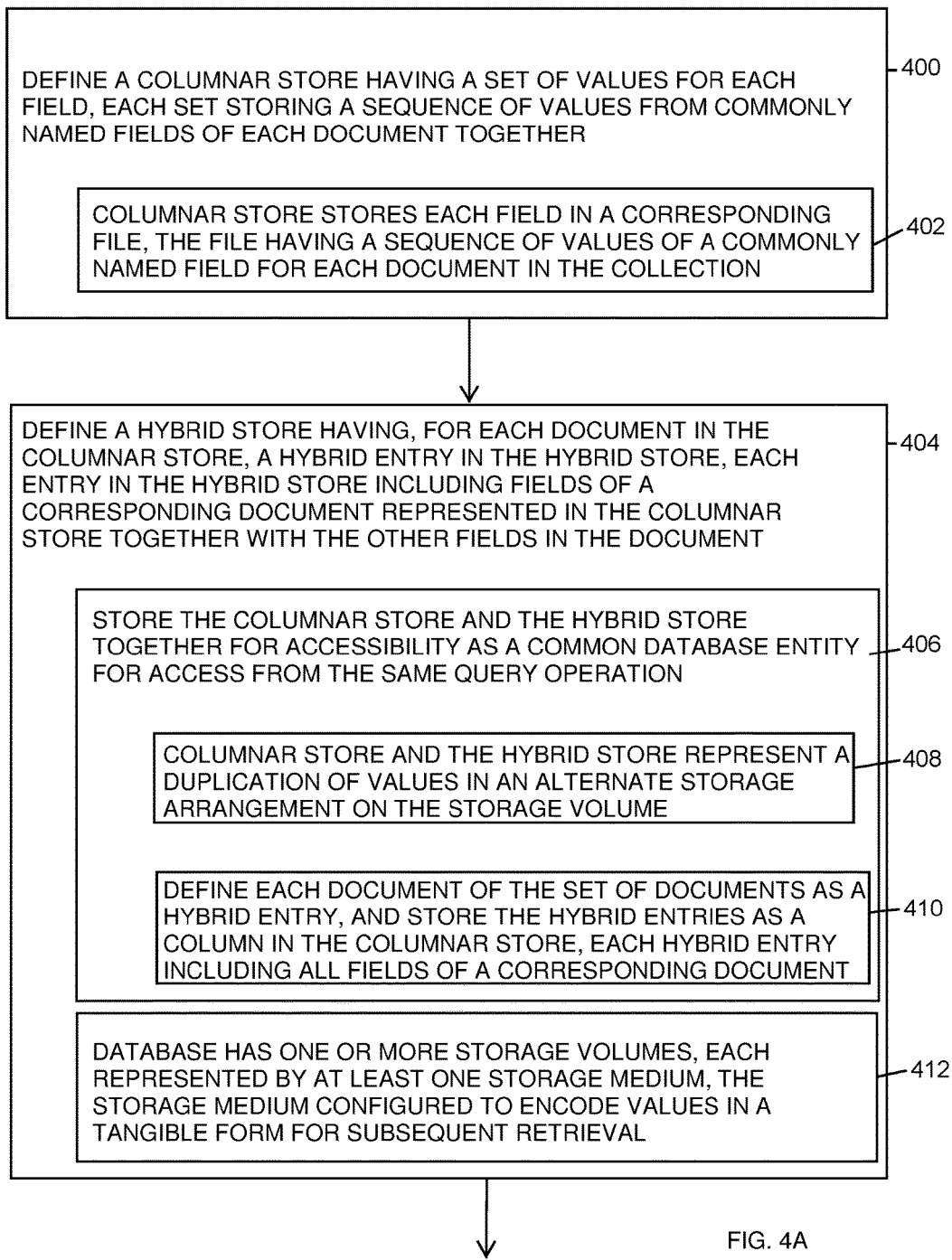
FIGS. 4a and 4b are a flowchart of storage and retrieval of data values stored according to FIGS. 2 and 3.
Figure 4B:
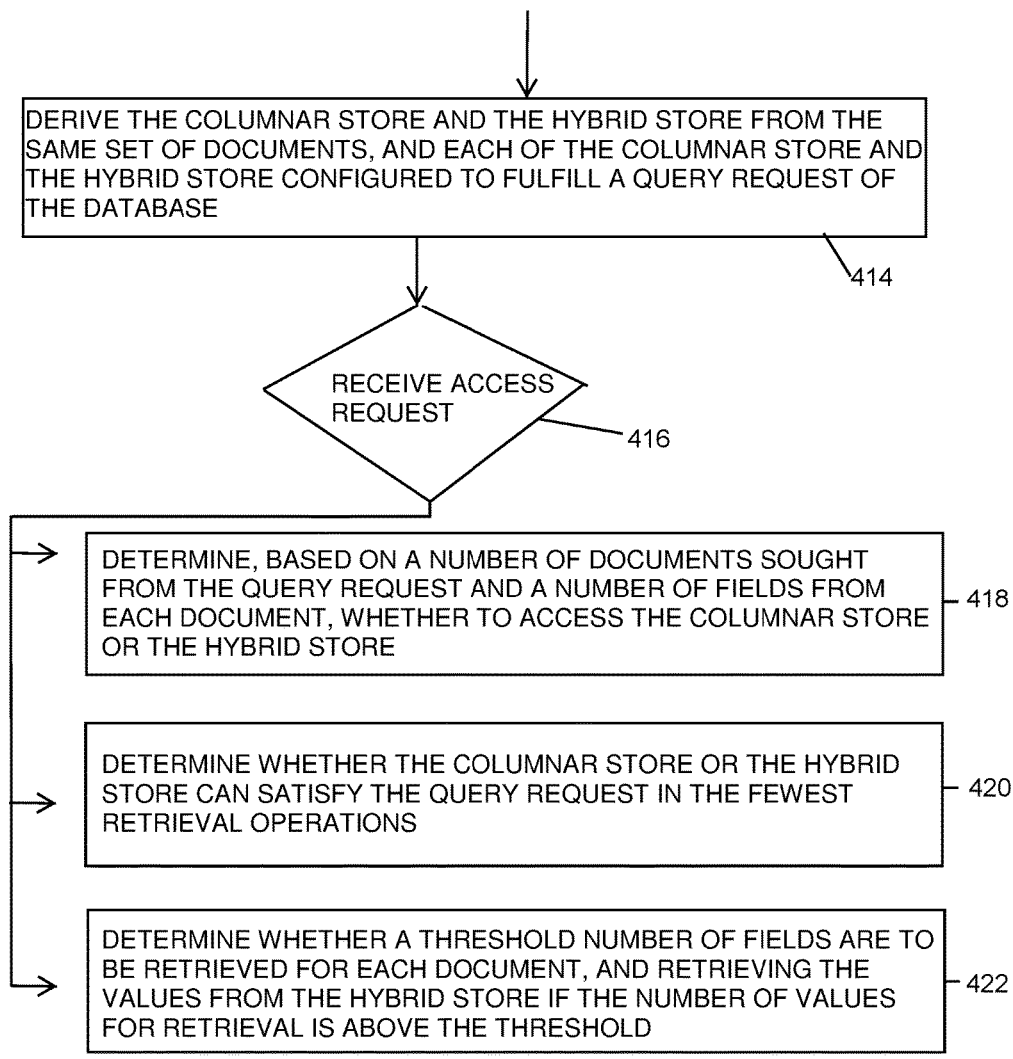

FIGS. 4A and 4B are a flowchart of storage and retrieval of data values stored according to FIGS. 2 and 3. Referring to FIGS. 1-4, in an example database, such as a JSON database, having a set of documents 130, in which each document 132 has at least one field with a value, the method of storing data as disclosed herein includes, at step 400, defining a hybrid column portion 212 having a set of values 204 for each field 202, such that each set stores a sequence of values from commonly named fields 202 of each document together. In the example configuration, the hybrid column portion 210 stores each field 202 in a corresponding file 310, such that the file 310 has a sequence of values 204 of the commonly named field for each document 132 in the collection 130, as depicted at step 402.

The server 118 also defines the hybrid row portion 220 which has, for each document 132 in the hybrid column portion 210, a hybrid entry (document) 132 in the hybrid row portion 220, such that each entry in the hybrid row portion 220 includes the fields 202 of the corresponding document 132 represented in the hybrid column portion 210 together with the other fields in the document 132, thus grouping all fields from the same document together, as shown at step 404. The database 124 stores the hybrid column portion 210 and the hybrid row portion 220 together for accessibility as a common database entity 250 for access from the same query operation, as depicted at step 406, such as in the same storage volume, directory or file arrangement so that the query logic 152 may access either.

In the example arrangement, the combination of the hybrid column portion 210 and the hybrid row portion 220 may represent a duplication of values in an alternate storage arrangement on the storage volume, as disclosed at step 408, however the improvement in performance offsets the marginal increase in required storage. In operation, the server 118 defines each document 132 of the set of documents as a hybrid entry, as depicted at step 410. The server 118 stores the hybrid entries as a column 212 in the hybrid row portion 320, similar to a column in the hybrid column portion 310, in which each hybrid entry includes all fields 202 of a corresponding document 132. In other words, the hybrid row portion 320 may be implemented as a columnar file having a single field for the entire document, and thus is accessible in a similar manner as the hybrid column portion 210.

In the example configuration, the database 124 has one or more storage volumes, each represented by at least one storage medium such as a disk drive or SSD, as physical storage constraints permit, as disclosed at step 412. Any suitable storage medium configured to encode values in a tangible form for subsequent retrieval may be employed with the configurations herein.

The server 118 then derives or populates the hybrid column portion 210 and the hybrid row portion 220 from the same set 130 of documents, such that each of the hybrid column portion 210 and the hybrid row portion 220 are configured to fulfill a query request 126 of the database, as depicted at step 414. In response to a received access or request 126 to read or modify the database 124, as shown at step 416, the query logic 152 computes whether to access the hybrid column portion 210 or the hybrid row portion 220. The query logic 149 determines, based on a number of documents 132 sought from the query request 126 and a number of fields 202 from each document 132, whether to access the hybrid column portion 210 or the hybrid row portion 220, as depicted at step 418. Alternatively, the query logic 152 may determine whether the hybrid column portion 210 or the hybrid row portion 220 can satisfy the query request 126 in the fewest retrieval operations, as shown at step 420. Further analysis may include determining whether a threshold number of fields 202 are to be retrieved for each document 132, and retrieving the values from the hybrid row portion 320 if the number of values for retrieval is above the threshold, as depicted at step 422. The query logic 152 weighs the individual retrieval or fetch requests saved by accessing all document fields in the hybrid row portion 220.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a database having a set of documents, each document having at least one field with a value, a method of storing data comprising:
    defining a hybrid column portion having a set of values for each field, each set storing a sequence of values from commonly named fields of each document together wherein the hybrid column portion stores each field in a corresponding file, the file having a sequence of values of a commonly named field for each document in a collection; and
    defining a hybrid row portion having, for each document in the hybrid column portion, a hybrid entry in the hybrid row portion, each entry in the hybrid row portion including fields of a corresponding document represented in the hybrid column portion together with the other fields in the document, the hybrid column portion and the hybrid row portion derived from the same set of documents, and each of the hybrid column portion and the hybrid row portion fulfills a query request of the database; and
    determining, based on a number of fields needed to fulfill the query request, whether the hybrid column portion or the hybrid row portion can satisfy the query request in the fewest retrieval operations.

2. In a database having a set of documents, each document having at least one field with a value, a method of storing data comprising:
    defining a hybrid column portion having a set of values for each field, each set storing a sequence of values from commonly named fields of each document together; and defining a hybrid row portion having, for each document in the hybrid column portion, a hybrid entry in the hybrid row portion, each entry in the hybrid row portion including fields of a corresponding document represented in the hybrid column portion together with the other fields in the document,
    the hybrid column portion and the hybrid row portion derived from the same set of documents, and each of the hybrid column portion and the hybrid row portion fulfills a query request of the database; and
    determining whether a threshold number of fields are to be retrieved for each document, and retrieving the values from the hybrid row portion if the number of values for retrieval is above the threshold.

3. The method of claim 2 further comprising determining, based on a number of documents sought from the query request and a number of fields from each document, whether to access the hybrid column portion or the hybrid row portion.

4. The method of claim 2 further comprising storing the hybrid column portion and the hybrid row portion together for accessibility as a common database entity for access from the same query operation, wherein the hybrid column portion stores each field in a corresponding file, the file having a sequence of values of a commonly named field for each document in a collection.

5. The method of claim 2 wherein the database has one or more storage volumes, each represented by at least one storage medium, the storage medium configured to encode values in a tangible form for subsequent retrieval.

6. The method of claim 5 wherein the hybrid column portion and the hybrid row portion represent a duplication of values in an alternate storage arrangement on the storage volume.

7. The method of claim 2 further comprising:
    defining each document of the set of documents as a hybrid entry; and
    storing the hybrid entries as a column in the hybrid column portion, each hybrid entry including all fields of a corresponding document.

8. The method of claim 2 further comprising:
    receiving a value of a first data field;
    receiving a value of a second data field;
    storing the value of the first data field in a first hybrid column portion;
    storing the value of the second data field in a second hybrid column portion; and
    storing the first data field and the second data field together as a field in a hybrid row portion.

9. The method of claim 3 wherein the set is a collection of documents in a JSON (JavaScript Object Notation) database.

10. A database system for unstructured or semi-structured data, comprising:
    a computing processor;
    a set of documents, each document having at least one field with a value; a hybrid column portion on a storage medium having a set of values for each field, each set storing a sequence of values from commonly named fields of each document together wherein the hybrid column portion stores each field in a corresponding file, the file having a sequence of values of a commonly named field for each document in a collection;
    a hybrid row portion on the storage medium having, for each document in the hybrid column portion, a hybrid entry in the hybrid row portion, each entry in the hybrid row portion including fields of a corresponding document represented in the hybrid column portion together with the other fields in the document, the hybrid column portion and the hybrid row portion both derived from the set of documents, and each of the hybrid column portion and the hybrid row portion fulfills a query request of the database; the query request based on a determination of a number of fields needed to fulfill the query request and whether the hybrid column portion or the hybrid row portion can satisfy the query request in the fewest retrieval operations; and the hybrid column portion and the hybrid row portion coupled for accessibility as a common database entity for access from the same query request operation.

11. The database system of claim 10 further comprising a server having query logic, the database responsive to the query logic for determining, based on a number of documents sought from the query request and a number of fields from each document, whether to access the hybrid column portion or the hybrid row portion.

12. The database system of claim 11 wherein the query logic is further operable to determine whether the hybrid column portion or the hybrid row portion can satisfy the query request in the fewest retrieval operations.

13. The database system of claim 10 further comprising query logic determining whether the hybrid column portion or the hybrid row portion can satisfy the query request in the fewest retrieval operations.

14. The database system of claim 10 further comprising:
    a hybrid entry in the hybrid row portion for defining each document of the set of documents, the hybrid entries stored as a column in the hybrid column portion, each hybrid entry including all fields of a corresponding document.

15. The database system of claim 10 wherein the database has one or more storage volumes, each represented by at least one storage medium, the storage medium encodes values in a tangible form for subsequent retrieval, wherein the hybrid column portion and the hybrid row portion represent a duplication of values in an alternate storage arrangement on the storage volume.

16. A computer program product on a non-transitory computer readable storage medium having instructions that, when executed by a processor, perform a method for storing data in an unstructured or semi structured database, the method comprising:
receiving data for a plurality of fields in documents, each field having a value;
storing the values of similarly named fields together as a hybrid column portion;
storing an aggregation of fields from each document together as a hybrid row portion, each of the hybrid column portion and the hybrid row portion fulfills a query request of the database;
defining a hybrid column portion having a sequential file for each commonly named field from across all documents in a collection, the hybrid column portion storing similarly named fields adjacent, and a hybrid row portion having a sequential file for storing each document in the collection, the hybrid row portion storing fields in each document adjacent; and
determining, based on a number of fields needed to fulfill the query request, whether the hybrid column portion or the hybrid row portion can satisfy the query request in the fewest retrieval operations.

17. The method of claim 1 further comprising:
determining a number of retrieval operations from the hybrid row portion to fulfill the query request;
determining a number of retrieval operations from the hybrid column portion to fulfill the query request; and
fulfilling the query request from the portion that fulfills the query request in the fewest retrieval operations.

* * * * *